United States Patent [19]

York et al.

[11] Patent Number: 4,752,377
[45] Date of Patent: Jun. 21, 1988

[54] FLUID CATALYST PROCESS WITH STEAM INJECTION INTO CATALYST STANDPIPE

[75] Inventors: Randal E. York; Dwain R. Parker; Frank W. Skraba, all of Sweeny, Tex.

[73] Assignee: Phillips Petroleum Company, Bartlesville, Okla.

[21] Appl. No.: 852,695

[22] Filed: Apr. 16, 1986

[51] Int. Cl.⁴ ............................................. C10G 11/18
[52] U.S. Cl. .................................... 208/113; 208/150; 208/164; 422/144
[58] Field of Search ............... 208/113, 146, 150, 153, 208/157, 164; 422/140, 144

[56] References Cited

U.S. PATENT DOCUMENTS

| | | | |
|---|---|---|---|
| 2,606,863 | 8/1952 | Rehbein | 208/150 |
| 2,695,866 | 11/1954 | McGratn | 208/150 X |
| 2,740,750 | 4/1956 | Howard | 208/150 |
| 2,883,332 | 4/1959 | Wickham | 208/150 |
| 2,985,517 | 5/1961 | Harper et al. | 23/288 |
| 3,152,065 | 10/1964 | Sharp et al. | 208/157 |
| 3,246,960 | 4/1966 | Sharp et al. | 23/288 |
| 3,785,782 | 1/1974 | Cartmell | 23/288 |
| 3,848,811 | 11/1974 | Fryback | 239/552 |
| 4,310,411 | 1/1982 | Wilkening | 208/164 X |

Primary Examiner—Helen M. S. Sneed
Assistant Examiner—Glenn Caldarola
Attorney, Agent, or Firm—John R. Casperson

[57] ABSTRACT

In a fluid catalytic cracking unit where oil and steam are mixed with regenerated catalyst the individual and combined improvements: (1) extending the oil-steam line into the riser reactor at least to a point where the axis of the riser is intersected by an imaginery extension of the inside diameter of the catalyst standpipe and (2) installation of a plurality of purge gas points beneath the regenerator slide valve in the catalyst standpipe.

5 Claims, 2 Drawing Sheets

FLUID CATALYST PROCESS WITH STEAM INJECTION INTO CATALYST STANDPIPE

BACKGROUND OF THE INVENTION

In one aspect, the invention relates to a fluid catalyst unit. In another aspect, the invention relates to improving the standpipe seal in a fluid catalyst unit. In a further aspect, the invention related to an improved fluid catalytic cracking process.

The bulk density of a fluid catalyst is an important characteristic which has a large influence on the fluidizability of the catalyst. Many newer fluid catalytic cracking catalysts, for example, have a higher bulk density than older catalysts. For example, several years ago, fluid catalytic cracking catalysts having bulk densities in the range of 0.75 to 0.85 were common. Today, some fluid catalytic cracking catalysts exhibit bulk density in the range of from above 0.85 to above 0.95 g/cc, a bulk density increase in many instances in excess of 10 percent. Old equipment designed for circulation of the older, lower bulk density catalysts may encounter problems when an attempt is made to switch over to newer style, higher bulk density catalysts. However, the newer cracking catalysts are generally desirable because they provide advantages in product selectivity, attrition resistance and longer half-life. An apparatus to provide good circulation of new high bulk density cracking catalyst would clearly be very desirable, especially where old style cracking units could be retrofitted. A process to overcome difficulties in circulating high bulk density fluid cracking catalysts would also be desirable.

OBJECTS OF THIS INVENTION

It is an object of this invention to provide an apparatus suitable for application to a fluid catalyst unit to enable the unit to accommodate high bulk density fluid catalysts.

It is another object of this invention to provide a process for improving a standpipe seal in a fluid catalyst unit.

SUMMARY OF THE INVENTION

In one embodiment of the invention, a catalytic unit comprises a catalyst regenerator and a transfer line reactor. A standpipe connects the regenerator to the transfer line. A valve is positioned in a lower portion of the standpipe to control the rate of catalyst flow through the standpipe. A feed injector empties axially into the transfer line reactor at a position adjacent the lower end of the standpipe. When one such cracking unit, for example, was charged over to a higher bulk density cracking catalyst, it was found that coke deposits accumulated on the control valve in the standpipe, interfering with its operation and diminishing control over catalyst circulation in the unit. In an effort to minimize this coking phenomenon the feed injector assembly was extended further up the transfer line and purge gas facilities were installed underneath the standpipe valve. The nozzles on the feed injector were also reduced in size to provide for higher velocity. With these modifications in place, it was found that with the purge gas off, a gasket by the standpipe valve began to leak oil, indicating the potential of coke buildup on the standpipe valve whereas with the purge gas on, no oil leakage was observed. Earlier, it had been found that extending the feed injection further into the transfer line provided some benefit by itself, mitigating but not obviating the coke buildup problem.

In another aspect of the invention there is provided an improvement for a fluid catalytic process. The improvement is applicable to a process which utilizes a flow of a regenerated catalyst through a standpipe to form a seal between a catalyst regenerator into which oxygen-containing gas is charged and a transfer line reactor into which oil is charged, such as a fluid catalytic cracking unit. In such units, the flow rate of the regenerated catalyst can be manipulated by at least one valve, usually a slide valve, which is positioned in the standpipe. The improvement of this aspect of the invention comprises introducing a seal gas into the standpipe at a position between the slide valve and the transfer line. The seal gas can help prevent oil migration from causing coke deposits in a manner which can lead to loss of catalyst flow rate control.

DETAILED DESCRIPTION OF THE INVENTION

Figure 1:
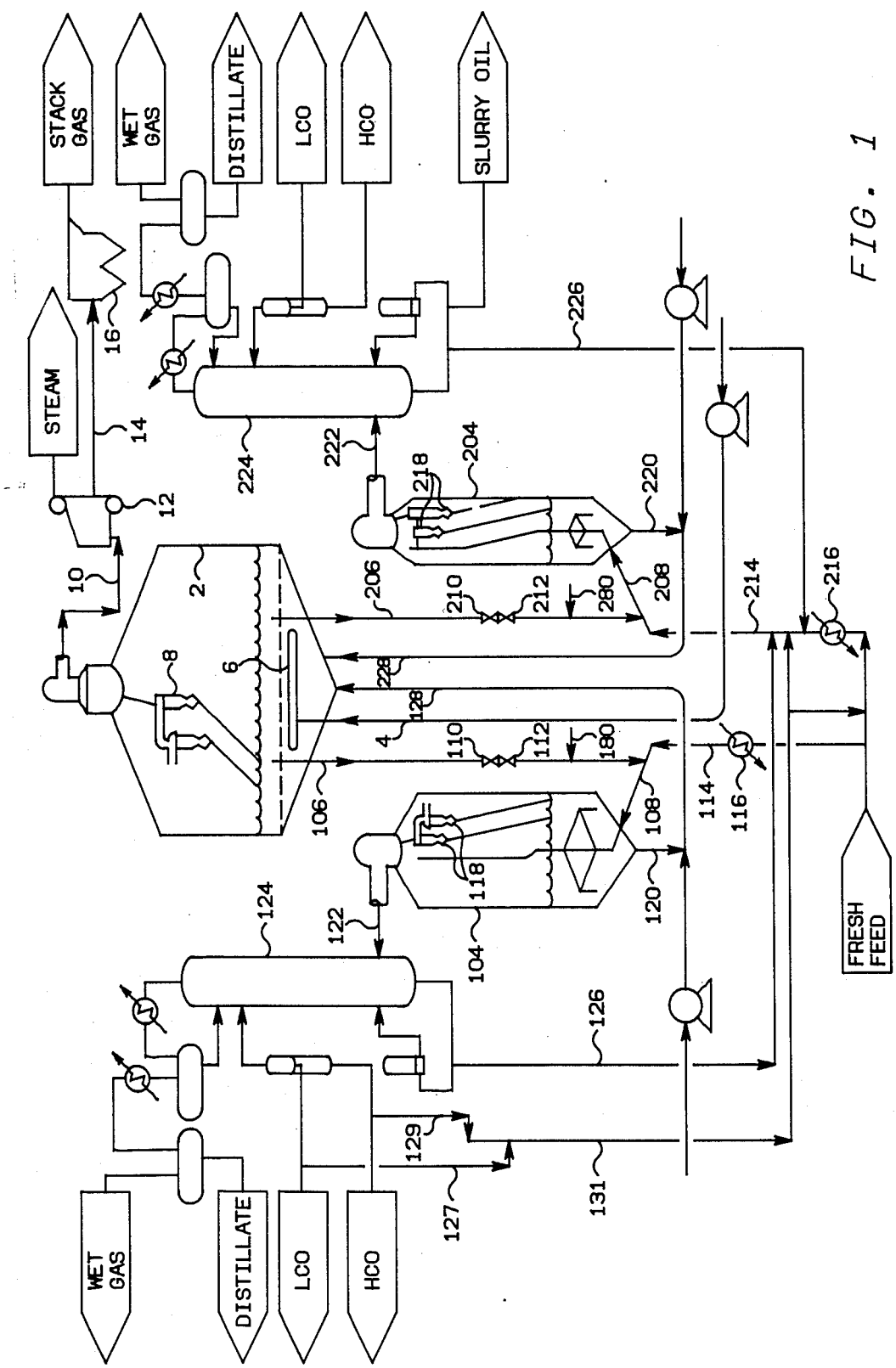
FIG. 1 illustrates schematically one type of catalytic unit in which the present invention may be utilized.

With reference to FIG. 1, one type of fluid catalytic unit to which the invention may be applied comprises a fluid catalytic cracking unit (FCCU) formed from a regenerator 2 and a pair of separators, usually called reactors, 104 and 204. It should be understood that the invention is not limited to the use of two reactors, but that a cracking unit having two reactors has been modified according to the invention with good results and is therefore described herein for the purposes of illustration. Suitable catalysts for such a unit are well known and generally comprise a zeolite dispersed in a silica-alumina support having a particle size principally in the range of 10–200 microns. Pore volume is generally in the range of 0.1–1 $m^2g$ and surface area is generally in the range of 50–500 $m^2/g$. Standpipes 106 and 206 connect a lower portion of the catalyst regenerator 2 with transfer lines 108 and 208 which carry the catalyst upwardly into the reactors 104 and 204. Valves 110, 112 and 210, 212 are provided in the standpipes 106 and 206, respectively, to control the flow rate of hot cracking catalyst which is removed from the regenerator 2 and circulated via the transfer lines 108 and 208 to the reactors 104 and 204. Conduits 180, 280 empty into the standpipes 106, 206, beneath valves 112, 212, respectively.

A suitable fresh feed, usually an oil such as a gas oil, is conveyed to the lower end of the transfer lines 108 and 208 by conduits 114 and 214. The feed is generally preheated such as by flowing through heaters or furnaces 116 and 216 prior to being introduced, usually admixed with steam, into the transfer lines, where it is vaporized, mixed with hot cracking catalyst from the regenerator, cracked, and passed into the reactors 104 and 204.

The reactors 104 and 204 each contain a plurality of separators 118, 218, usually cyclone separators, which separate spent catalyst for withdrawal from the reactors via lines 120 and 220 from product which is withdrawn via lines 122 and 222. Product from the reactors is separated in fractionation systems 124 and 224 into the desired cuts such as wet gas, distillate, light cycle oil (LCO), heavy circle oil (HCO) and slurry oil. The cycle oils and slurry oils can be recycled if desired through a transfer line reactor. For example, slurry oil from fractionation unit 124 can be recycled to the transfer line 208 via the line 126. Slurry oil from the fractionation unit 224 can be recycled to the transfer line reactor 208 via the line 226. Cycle oils from the fractionation unit 124 can be recycled via lines 127 and 129 which come together to form line 131 leading back via line 214 to transfer line 208.

Spent cracking catalyst from the lines 120 and 220 is conveyed to the regenerator 2 via the lines 128 and 228. In the regenerator 2, accumulated coke on the catalyst is burned off with air introduced via line 4 and distributor 6. Offgas from the regenerator 2 is separated from the cracking catalyst in separator 8 and conveyed via a line 10 to boiler 12 for steam production. Cooled gases are withdrawn from the boiler 12 and conveyed via line 14 to precipitators 16 for the separation of catalyst fines and the production of the stack gas for disposal.

Figure 2:
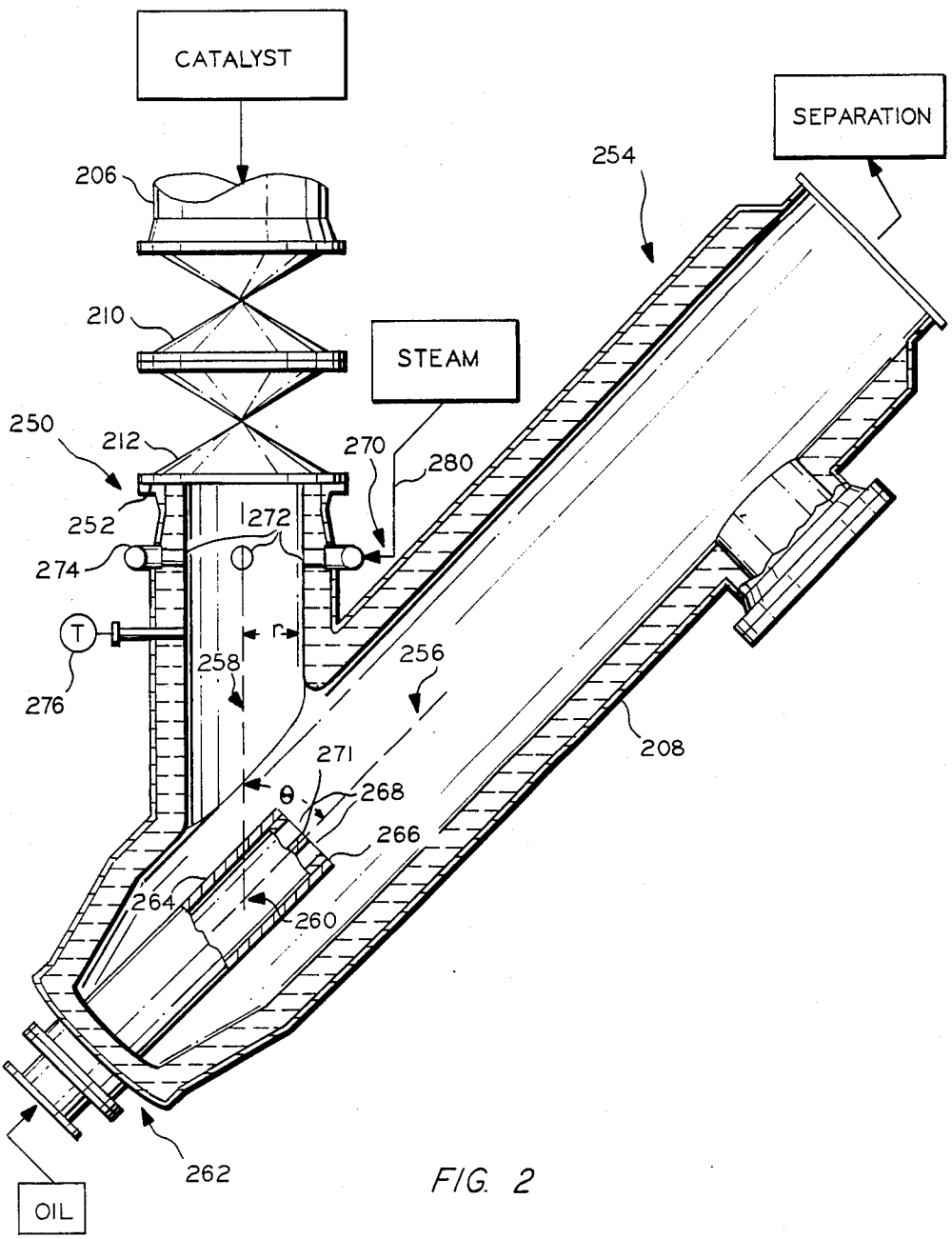
FIG. 2 illustrates in greater detail a portion of the apparatus of FIG. 1 to show additional features of the present invention.

FIG. 2 illustrates the portion of the apparatus of FIG. 1 positioned near the intersection of the standpipe 206 and the transfer line reactor 208. The regenerator 2 can provide a source of catalyst as represented by the "catalyst" box. The "fresh feed" input can provide a source of oil as represented by the "oil" box. The reactor 204 can provide a means for separating product from spent catalyst as represented by the "separation" box. In one embodiment of the invention, a source of seal gas can be provided, as illustrated by the "steam" box, for example.

The standpipe 206 has a lower portion illustrated generally by the numeral 250 in which at least one valve, such as the slide valves 210 and 212, is positioned for controlling the flow of catalyst through the standpipe. The at least one valve has a lower flange face 252 which serves hereinafter as a reference point. The transfer line has an upper portion which extends generally vertically in the reactor 204, (FIG. 1) and is usually termed a "riser" and a lower portion illustrated generally by the numeral 254 and which is shown in FIG. 2. The lower portion of the standpipe and the lower portion of the transfer line are generally lined with refractory material as is known in the art to provide insulation.

In the preferred embodiment, the lower portion of the transfer line has a longitudinal axis illustrated by a dashed line called out by the numeral 256. The lower portion 250 of the standpipe also has a longitudinal axis illustrated by a dashed line called out by the numeral 258. The lower portion 250 of the standpipe is connected to the lower portion 254 of the transfer line so that a projection from the longitudinal axis 258 of the lower portion of the standpipe crosses the longitudinal axis 256 of the lower portion of the transfer line to define an imaginary intersection point called out by the numeral 260. An angle $\theta$ is formed between the longitudinal axes of the standpipe and the transfer line which generally ranges from about 20° to about 70° so that catalyst flowing from the lower portion 250 of the standpipe and into the lower portion 254 of the transfer line reactor undergoes a change in direction in the range of about 110° to about 160° as it flows toward separation at the downstream end of the transfer line.

A closure 262 seals a lower end (upstream end) of the lower portion 254 of the transfer line reactor 208. In the preferred embodiment an oil injector 264 extends through the closure 262 generally along the longitudinal axis 256 of the transfer line reactor. The oil injector itself preferably has a longitudinal axis which coincides with the axis 256 of the transfer line. An outlet end 266 of the oil injector 264 is provided with ports 268 for the introduction of an oil-gas mixture into the lower portion 254 of the transfer line 208. The outlet end 266 of the oil injector 264 lies in a plane which is normal to the longitudinal axis of the oil injector to define an "end point" of the oil injector which is the intersection of the longitudinal axis, in this instance, the axis 256, with the plane of the end of the oil injector. The "end point" of the oil injector is designated the reference numeral 271.

In one embodiment of the invention, the oil injector 264 is positioned in the lower portion 254 of the transfer line reactor so that the end 266 of the oil injector 264 extends beyond (downstream of) the intersection 260 of the standpipe and transfer line axes. Preferably, the end point 271 is positioned on the longitudinal axis 256 at a distance ranging from the intersection point 260 to a distance of $1.5(r/\cos\theta)$ from the point 260, where r is the radius of the lower end of the standpipe as illustrated in FIG. 2. Preferably, the end point 271 of the end 266 of the oil injector 264 is positioned along the axis of the transfer line at a distance ranging from about $0.75(r/\cos\theta)$ to about $1.25(r/\cos\theta)$ from the intersection 260 by extending the oil injector 264 beyond the point 260. More preferably, the end point 271 of the oil injector 264 is positioned on the transfer line axis in the range of $0.9(r/\cos\theta)$ to about $1.1(r/\cos\theta)$ from the intersection 260. Most preferably, the end point 270 of the oil injector 264 is positioned on the transfer line axis at about a distance of $r/\cos\theta$ from the intersection 260 because such a positioning has been tested with good results when used in conjunction with a seal gas as described hereinafter.

In another embodiment of the invention, there is provided a plurality of inlets 272 in the lower portion 250 of the standpipe 206. The inlets 272 are positioned between the lower valve face 252 and the lower portion 254 of the transfer line 208. A conduit means 270 connects a suitable seal gas source, such as "steam" to the inlets 272. Preferably, the plurality of inlets 272 each have a radius in the range of about 0.05r to about 0.15r where r is the radius of the standpipe near the lower end thereof, and open inwardly into the lower portion 250 of the standpipe toward the longitudinal axis 258 of the lower portion 250 of the standpipe. Preferably, the inlets 272 are positioned at a distance in the range of from about 0.05r to about 5r from the lower flange face 252 as measured to the inlet axis or centerline. More preferably, the inlets 272 are positioned so that their centerlines are positioned at a distance in the range of from about 0.5r to about 2r from the lower flange face 252 with the inlets 272 being generally equally circumferentially spaced around the inside of the standpipe and being from 3 to 12 in number, such as four, for example. Where the inlets 272 are spaced at the same longitudinal position, a convenient means 270 for connecting the inlets 272 to the steam source can include a ring header 274 and the conduit 280.

In the embodiments of the invention relating to a fluid catalytic process, a seal gas is introduced into the standpipe at a position between the standpipe valve and the connection of the standpipe with the transfer line. The seal gas mitigates or precludes coke deposition on the valve due to migration of oil from the oil injector so that good control over the flow rate of regenerated catalyst can be maintained by the at least one valve, preferably a slide valve, positioned in the standpipe. The seal gas is preferably introduced into the standpipe at a rate which is adequate to prevent coke deposits from accumulating on the valve in amounts sufficient to interfere with adjustment of the valve. However, the seal gas rate should not be so high as to interfere with proper catalyst flow. Generally, much less than 1 part by weight of steam will be introduced into the standpipe for each 100 parts by weight of catalyst. For a fluid catalytic cracking unit, usually less than 0.1 part by weight of steam will be introduced into the standpipe for each 100 parts by weight of cracking catalyst introduced into the standpipe from the regenerator. For example, as little as 0.001 lbs of steam per 100 lbs of cracking catalyst would be expected to provide some benefit. Preferably, in the range of 0.005 to 0.1 lbs of steam is introduced into the standpipe for each 100 parts by weight of cracking catalyst.

One manner in which the adequacy of seal gas flow can be determined is to utilize a temperature sensor 276 positioned between the inlets 272 and the transfer line. An increase in temperature at this point could indicate oil penetration from the injector 264 coupled with the occurrence of combustion with oxygen carried in through the standpipe with the hot catalyst and thus inadequate seal gas flow.

The coking phenomenon was first noticed following a unit switch to a cracking catalyst of higher bulk density. It is therefor believed that the process of the invention has special applicability when the regenerated catalyst is characterized by a relatively high bulk density, for example, in the range of from about 0.85 g/cc to about 1.3 g/cc. The invention has been demonstrated with fluid cracking catalysts having an apparent bulk density in the range of from about 0.9 g/cc to about 1 g/cc.

In order to further reduce the possibility of oil migration from the injector 264 to the valve 212 it is desirable that the oil be emitted in a generally longitudinal direction into the transfer line from an extended position beyond the standpipe centerline. Preferably, the end of the oil injector is in approximate alignment with the inside wall surface of the standpipe with the oil injector extending across the downstream end of the standpipe.

Since the amount of steam required to practice this aspect of the invention is relatively low, high-pressure steam is generally not required. In one embodiment of the invention, for catalyst flow through a 24-inch inside diameter (I.D.) standpipe at a rate of about 7.5 tons per minute and a temperature of about 1300° F., 200 lbs per hour of 40 psig, 292° F. steam provided good results when introduced through four equally spaced inlets 272 of 1 inch inside diameter positioned about 12 inches beneath the lower flange face 252. The FCC catalyst had an apparent bulk density of 0.95g/cc. Oil/steam injection velocity was about 100 feet per second through the nozzle ports 268 and the end point of the injector was positioned on the transfer line axis at r/cos$\theta$ ($\theta$=45°) from the intersection with the standpipe axis. The transfer line had a 36-inch I.D. The injector had about a 12¾ inch outside diameter (O.D).

That which is claimed is:

1. In a catalytic cracking process utilizing downward flow of a regenerated cracking catalyst through a standpipe defined by an inside wall surface to form a seal between a catalyst regenerator and a transfer line reactor having an oil injector positioned therein to emit oil into a bottom end of the transfer line reactor for cracking in the transfer line reactor, wherein the bottom end of the standpipe is connected to a bottom end of the transfer line reactor forming an angle as measured between a longitudinal axis of the standpipe and a longitudinal axis of the transfer line reactor of between about 20° and about 70° so that cracking catalyst flowing from the standpipe and into the transfer line undergoes a change in direction in the range of about 110° to about 160°, wherein the flow rate of said regenerated cracking catalyst is controlled by adjustment of at least one slide valve positioned in the standpipe, the improvement which comprises introducing a seal gas into a vertically positioned portion of the standpipe at a position between the slide valve and the transfer line reactor.

2. A process as in claim 1 wherein the seal gas is introduced into the vertically positioned portion of the standpipe at a rate adequate to prevent coke deposits from accumulating on the slide valve in amounts sufficient to interfere with adjustment of the slide valve.

3. A process as in claim 1 wherein the improvement further comprises, in combination with the introduction of seal gas, the flow of a regenerated cracking catalyst which is characeterized by a bulk density in the range of about 0.85 g/cc to about 1.3 g/cc, and wherein in the range of 0.001 to about 0.1 parts by weight of seal gas is introduced into the standpipe for each part by weight of regenerated cracking catalyst which flows through the standpipe.

4. A process as in claim 3 wherein the improvement further comprises, in combination with the introduction of seal gas, the flow of a regenerated cracking catalyst which is characterized by a bulk density in the range of from about 0.9 g/cc to about 1 g/cc.

5. A process as in claim 1 wherein the improvement further comprises, in combination with the introduction of seal gas; the flow of cracking catalyst having a bulk density in the range of from about 0.9 g/cc to about 1 g/cc; and emitting the oil from the oil injector generally longitudinally into the transfer line reactor from a position in approximate alignment with the inside wall surface of the standpipe, said oil injector extending across the downstream end of the standpipe, wherein the range of 0.005 to about 0.1 parts by weight of seal gas is introduced into the standpipe for each part by weight of regenerated cracking catalyst which flows through the standpipe.

* * * * *